J. E. SMITH.
FIREMAN'S BELT.
APPLICATION FILED JULY 17, 1908.
913,171.
Patented Feb. 23, 1909.
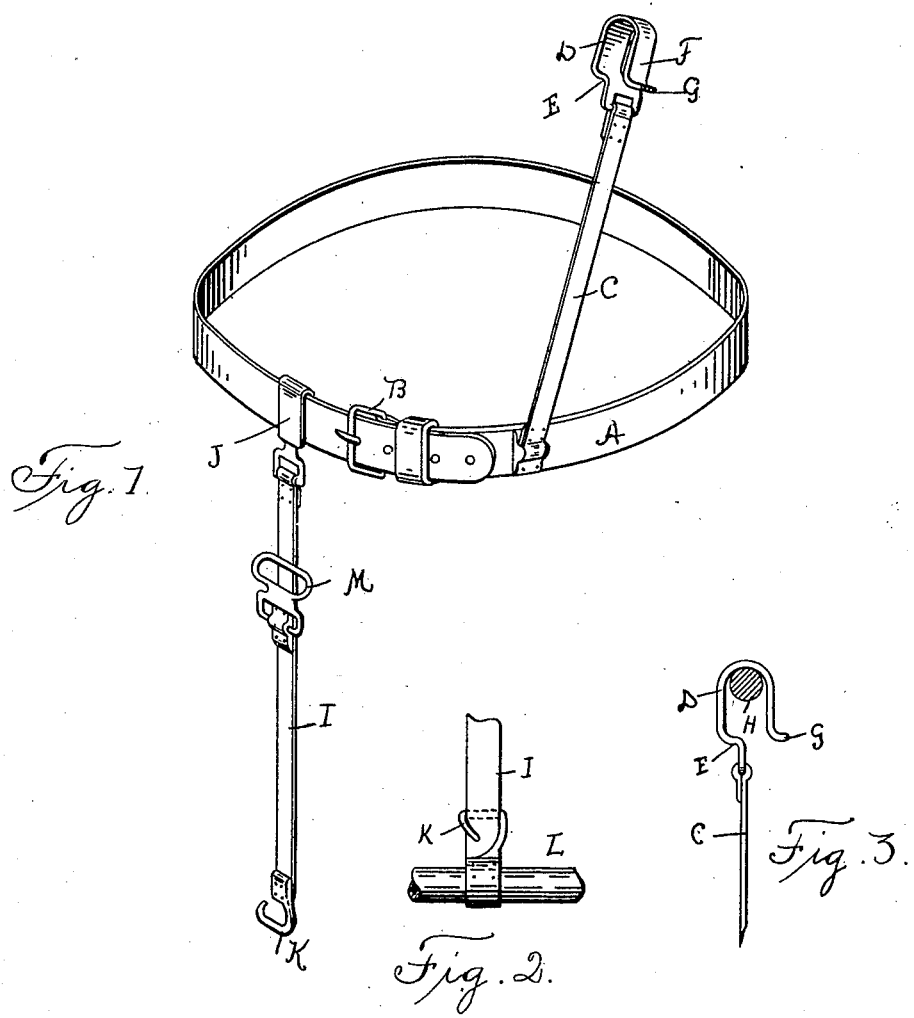
WITNESSES
Lucy Verrill
Marion Richards
INVENTOR:
James E. Smith
by Clifford Vernee Clifford,
Attorneys

UNITED STATES PATENT OFFICE.

JAMES E. SMITH, OF SOUTH PORTLAND, MAINE.

FIREMAN'S BELT.

No. 913,171.     Specification of Letters Patent.     Patented Feb. 23, 1909.

Application filed July 17, 1908. Serial No. 444,014.

*To all whom it may concern:*

Be it known that I, JAMES E. SMITH, a citizen of the United States, residing at South Portland, county of Cumberland, and State of Maine, have invented a new and useful Fireman's Belt, of which the following is a specification.

This invention relates to a belt designed to be worn by firemen, linemen and others but more especially for the use of firemen. Its object is to provide a belt which shall be simple, durable, readily attached to or removed from the person and which is provided with means for safe attachment to a ladder or other means of support and with means for carrying a line of hose, cable or other object.

In the drawings herewith accompanying and making part of this application, Figure 1 is a perspective view of my improved belt; Fig. 2 is a detail showing the means of manipulating the carrier and Fig. 3 is a detail edge view showing the form of the hook for attaching the belt to the ladder.

Same letters of reference refer to like parts.

In said drawings A is a belt adapted to pass around the body of the wearer and to be secured to the body by a buckle B or other convenient means. Secured to the belt preferably near the front is a flexible strap C terminating in an open hook comprising an elongated body part D, an offset E and a tongue F extending down to and terminating at a point G adjacent said offset whereby the hook is prevented from accidental detachment. This hook is adapted to hook over a ladder round H or other means of support thus enabling the wearer of the belt to secure himself to the ladder thereby leaving both hands free.

When mounting a ladder and carrying a hose it is often very convenient to have both hands free and so I provide my belt with a hose carrier strap I secured to the belt in any convenient manner as by a loop J which may be free to slide on the belt as shown in Fig. 1 so as to position the hose carrier at any point around the belt. The hose carrier terminates in a hook K adapted when the strap I is folded back upon itself to engage the strap as shown in Fig. 2 and to embrace in the fold a line of hose L, the weight of the hose causing the hook to slide down on the strap until it hugs closely against the hose thus preventing the hose from slipping out, the greater the weight of the hose the tighter the hook engages the hose. The hook slides freely on the strap and is readily engaged or disengaged therefrom. Intermediate the hook and the belt secured to the strap is a handhold M furnishing a convenient means for supporting the hose by hand thus lessening the strain of the hose on the belt.

The advantages of my improved belt are that it is light, simple in construction, readily adjustable and simple in operation.

Having thus described my invention and its use I claim:—

1. In combination, a belt, a hose carrier comprising means of attachment to the belt, a hook on the end and a handhold intermediate the hook and point of attachment.

2. In combination, a belt, a hose carrier provided with means of attachment to the belt, a hook at its free end, a handhold intermediate the free end and the point of attachment to the belt and a strap provided with a hook having an elongated body part, an offset and a tongue terminating at a point adjacent said offset.

In testimony whereof, I have signed my name to this specification in presence of two subscribing witnesses this fifteenth day of July, 1908.

JAMES E. SMITH.

In presence of—
 ELGIN C. VERNÈE,
 MARION RICHARDS.